US006875513B2

(12) United States Patent
Honda et al.

(10) Patent No.: US 6,875,513 B2
(45) Date of Patent: Apr. 5, 2005

(54) TOP COAT FOR OUTER PANEL OF AUTOMOTIVE VEHICLE, COATING PROCESS THEREFOR, AND COAT FILM FORMED THEREBY

(75) Inventors: Yasufumi Honda, Yokohama (JP); Takehito Itoh, Kawasaki (JP); Tatsuya Ishihara, Tokyo (JP); Masahiko Yamanaka, Kanagawa (JP); Tetsuji Mizuno, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/365,513

(22) Filed: Feb. 13, 2003

(65) Prior Publication Data

US 2003/0175436 A1 Sep. 18, 2003

(30) Foreign Application Priority Data

Mar. 14, 2002 (JP) ....................................... 2002-069768

(51) Int. Cl.$^7$ ......................... B32B 27/38; B32B 27/30; B32B 27/08; B05D 1/36; B05D 3/02

(52) U.S. Cl. ....................... 428/413; 428/447; 428/523; 106/287.1; 427/385.5; 427/386; 427/387; 427/407.1; 427/409; 427/410

(58) Field of Search ................................ 428/413, 414, 428/416, 418, 447, 448, 450, 523; 525/107, 407, 474, 476, 479, 523, 524, 525, 529; 106/287.1; 427/287.22, 372.2, 384, 385.5, 386, 387, 402, 407.1, 409, 410

(56) References Cited

U.S. PATENT DOCUMENTS

| | | | | | |
|---|---|---|---|---|---|
| 5,376,706 A | | 12/1994 | Barsotti et al. | | |
| 6,015,848 A | * | 1/2000 | Ikushima et al. | ........... | 523/427 |
| 6,620,509 B1 | * | 9/2003 | Yamamoto et al. | ......... | 428/412 |
| 2003/0064229 A1 | * | 4/2003 | Ishihara et al. | ............. | 428/413 |

FOREIGN PATENT DOCUMENTS

| | | | | | |
|---|---|---|---|---|---|
| EP | 0 562 531 | A1 | 9/1993 | | |
| JP | 8-176465 | A | 7/1996 | | |
| JP | 9-299869 | A | 11/1997 | | |
| JP | 11-323242 | A | 11/1999 | | |
| JP | 2000-136221 | * | 5/2000 | ......... | C08F/290/12 |
| WO | WO 97/13809 | A1 | 4/1997 | | |

OTHER PUBLICATIONS

Machine Translation of JP 2000–136221, provided by the JPO website.*

Polymer Science Dictionary 2$^{nd}$ Edition, Mark Alger, 1987, (for silicone and polyorganosiloxane).*

"Test Method of Weatherability for Automotive Parts", Japanese Industrial Standard, JIS D 0205, 1987, pp. 1–45.

"Testing Methods for Paints—Part 4: Visual characteristics of Film—Section 5: Colorimetry (Measurement)", Japanese Industrial Standard, JIS K 5600–4–5, 1999, pp. 1–11.

"Testing Methods for Paints—Part 4: Visual Characteristics of Film—Section 6: Colorimetry (Calculation of Colour Differences)", Japanese Industrial Standard, JIS K 5600–4–6, 1999, pp. 1–5.

"Testing Methods for Paints—Part 5: Mechanical Property of Film—Section 4: Scratch Hardness (Pencil Method)", Japanese Industrial Standard, JIS K 5600–5–4, 1999, pp. 1–7.

Testing Methods for Paints—Part 5: Mechanical Property of Film—Section 6: Adhesion Test (Cross–cut Test). Japanese Industrial Standard, JIS K 5600–5–6, 1999, pp. 1–10.

Testing Methods for Paints—Part 7: Long–period Performance of Film—Section 2: Resistance to Humidity (Continuous Condensaton), Japanese Industrial Standard, JIS K 5600–7–2, 1999, pp. 1–7.

"Testing Methods for Paints—Part 7: Long–period Performance of Film—Section 6: Natural Weathering Test", Japanese Industrial Standard, JIS K 5600–7–6, 1999, pp. 1–11.

"Test Powders and Test Particles", Japanese Industrial Standard, JIS Z 8901, 1995, pp. 1–34.

"Standard Test Method for Chipping Resistance of Coatings", ASTM, Designation: D 3170–87, Mar. 1991, pp. 131–133.

* cited by examiner

*Primary Examiner*—Michael J. Feely
(74) *Attorney, Agent, or Firm*—Foley & Lardner LLP

(57) ABSTRACT

A top coat for an outer panel of an automotive vehicle includes a clear paint formed on a base coat paint. The clear paint is constituted of acrylic resin (A) having at least one ester group containing a silicone group and at least two epoxy groups in a molecule, acrylic resin (B) having at least two epoxy groups in a molecule, and acid cross-linking agent (C) having at least two chemically blocked carboxyl groups in a molecule. The base coat paint is constituted of acrylic resin (D) having at least two hydroxyl groups in a molecule, acrylic resin (E) having at least two hydroxyl groups and at least two epoxy groups in a molecule, and melamine resin (F) having a functional group capable of reacting with a hydroxyl group.

3 Claims, No Drawings

TOP COAT FOR OUTER PANEL OF AUTOMOTIVE VEHICLE, COATING PROCESS THEREFOR, AND COAT FILM FORMED THEREBY

BACKGROUND OF THE INVENTION

This invention relates to improvements in a top coat for an outer panel of an automotive vehicle, a coating method for the top coat, and a coat film formed by the coating method, and particularly to the top coat which is excellent in staining resistance, water repellency, oil repellency, acid rain resistance, scratch resistance and the like, the coating method for the top coat, and the coat film formed by the coating method.

In a top coat for an outer panel of an automotive vehicle, melamine cross-linking has been generally used to harden the coat film of the top coat. However, the melamine cross-linking has such a disadvantage as to be low in acid rain resistance. In order to overcome this disadvantage, a non-melamine type top coat using acid-epoxy cross-linking has been developed for the outer panel of the automotive vehicle. Further, in order to add the staining resistance to the top coat using the acid-epoxy cross-linking, blending a fluororesin or the like has been tried as disclosed in Japanese Patent Provisional Publication No. 11-323242.

SUMMARY OF THE INVENTION

However, the above blending a fluororesin or the like cannot provide an oil repellency to the coat film of the top coat though it can provide a water repellency. As a result, the coat film of the top coat can exhibit a sufficient staining resistance against hydrophilic stain such as stain with mud, but is insufficient in staining resistance against oily atmospheric fallouts such as exhaust gas, turpentine and the like. In view of the above, it is required to provide the coat film of the top coat with not only the water repellency but also the oil repellency in order that the coat film of the top coat exhibits the staining resistance against a wide range of staining substances. Tries for providing the water repellency and the oil repellency to the coat film of the top coat using the acid-epoxy cross-linking has not been hitherto made.

It is, therefore, an object of the present invention to provide an improved top coat for an outer panel of an automotive vehicle, an improved coating method for the top coat, and an improved coat film formed by the coating method, which can effectively overcome drawbacks encountered in conventional top coats for an outer panel of an automotive vehicle, coating methods for the top coat, and coat films formed by the coating methods.

Another object of the present invention is to provide an improved top coat for an outer panel of an automotive vehicle, an improved coating method for the top coat, and an improved coat film formed by the coating method, by which the top coat can exhibit an excellent staining resistance against atmospheric fallouts such as smoke and soot of exhaust gas or the like, turpentine, insects and the like, and an excellent acid rain resistance.

The present inventors have eagerly made research and development on the top coat using conventional acid-epoxy cross-linking in order to solve the problems encountered in the above conventional top coats. As a result, the present inventors have found that the problems can be overcome by using a specific acrylic resin having ester group containing silicone group and epoxy group in the top coat using the conventional acid-epoxy cross-linking, which leads to the principle of the present invention.

An aspect of the present invention resides in a top coat for an outer panel of an automotive vehicle. The top coat comprises a clear paint and a base coat paint. The clear paint includes first acrylic resin (A), second acrylic resin (B) and acid cross-linking agent (C). The first acrylic resin (A) has at least one group, represented by Eq. (1), and at least two epoxy groups in a molecule. The first acrylic resin is in an amount ranging from 1 to 20 parts by weight relative to 100 parts by weight of total of the first acrylic resin (A), the second acrylic resin (B) and the acid cross-linking agent (C), (1)

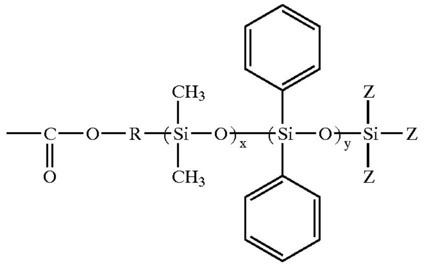

where R is an organic group having a carbon number ranging from 1 to 6; X is a number ranging from 0 to 2; Y is a number ranging from 0 to 2; and Z is $CH_3$ or O—Si—$(CH_3)_3$. The second acrylic resin (B) has at least two epoxy groups in a molecule. The second acrylic resin is in an amount ranging from 20 to 60 parts by weight relative to 100 parts by weight of the total of the first acrylic resin (A), the second acrylic resin (B) and the acid cross-linking agent (C). The acid cross-linking agent (C) has at least two chemically blocked carboxyl groups in a molecule. The acid cross-linking agent is in an amount ranging from 20 to 60 parts by weight relative to the total of the first acrylic resin (A), the second acrylic resin (B) and the acid cross-linking agent (C). The clear paint forms a coat film having a glass transition temperature ranging from 90 to 120° C. upon being hardened. The base coat paint includes third acrylic resin (D), fourth acrylic resin (E) and melamine resin (F). The third acrylic resin (D) has at least two hydroxyl groups in a molecule. The third acrylic resin is in an amount ranging from 15 to 55 parts by weight relative to 100 parts by weight of total of the third acrylic resin (D), the fourth acrylic resin (E) and the melamine resin (F). The fourth acrylic resin (E) has at least two hydroxyl groups and at least two epoxy groups in a molecule. The fourth acrylic resin (E) is in an amount ranging from 15 to 55 parts by weight relative to 100 parts by weight of the total of the third acrylic resin (D), the fourth acrylic resin (E) and the melamine resin (F). The melamine resin (F) has a functional group capable of reacting with a hydroxyl group. The melamine resin is in an amount ranging from 30 to 40 parts by weight relative to 100 parts by weight of the total of the third acrylic resin (D), the fourth acrylic resin (E) and the melamine resin (F).

Another aspect of the present invention resides in a process of coating top a coat for an outer panel of an automotive vehicle. The process comprises coating a base coat paint on an article; coating a clear paint on the coated base coat paint in a wet-on-wet manner; and heating the base coat paint and the clear paint to harden the paints so as to form a hardened coat film of the top coat. In the coating process, the clear paint includes first acrylic resin (A), second acrylic resin (B) and acid cross-linking agent (C). The first acrylic resin (A) has at least one group, represented by Eq. (1), and at least two epoxy groups in a molecule. The first acrylic resin is in an amount ranging from 1 to 20 parts by weight relative to 100 parts by weight of total of the first acrylic resin (A), the second acrylic resin (B) and the acid cross-linking agent (C).

(1)

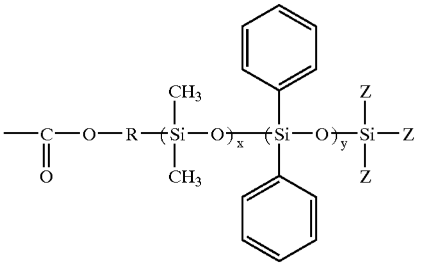

where R is an organic group having a carbon number ranging from 1 to 6; X is a number ranging from 0 to 2; Y is a number ranging from 0 to 2; and Z is $CH_3$ or O—Si—$(CH_3)_3$. The second acrylic resin (B) has at least two epoxy groups in a molecule. The second acrylic resin is in an amount ranging from 20 to 60 parts by weight relative to 100 parts by weight of the total of the first acrylic resin (A), the second acrylic resin (B) and the acid cross-linking agent (C). The acid cross-linking agent (C) has at least two chemically blocked carboxyl groups in a molecule. The acid cross-linking agent is in an amount ranging from 20 to 60 parts by weight relative to the total of the first acrylic resin (A), the second acrylic resin (B) and the acid cross-linking agent (C). The clear paint forms a coat film having a glass transition temperature ranging from 90 to 120° C. upon being hardened. The base coat paint includes third acrylic resin (D), fourth acrylic resin (E) and melamine resin (F). The third acrylic resin (D) has at least two hydroxyl groups in a molecule, the third acrylic resin being in an amount ranging from 15 to 55 parts by weight relative to 100 parts by weight of total of the third acrylic resin (D), the fourth acrylic resin (E) and the melamine resin (F). The fourth acrylic resin (E) has at least two hydroxyl groups and at least two epoxy groups in a molecule. The fourth acrylic resin (E) is in an amount ranging from 15 to 55 parts by weight relative to 100 parts by weight of the total of the third acrylic resin (D), the fourth acrylic resin (E) and the melamine resin (F). The melamine resin (F) has a functional group capable of reacting with a hydroxyl group. The melamine resin is in an amount ranging from 30 to 40 parts by weight relative to 100 parts by weight of the total of the third acrylic resin (D), the fourth acrylic resin (E) and the melamine resin (F).

A further aspect of the present invention resides in a coat film of a top coat for an outer panel of an automotive vehicle. The coat film comprises a layer of a base coat paint formed on an article, and a layer of a clear paint formed on the layer of the base coat paint. The coat film is formed by a process including coating the base coat paint on the article; coating the clear paint on the coated base coat paint in a wet-on-wet manner; and heating the base coat paint and the clear paint to harden the paints so as to form the coat film in a hardened state. In the coat film, the clear paint includes first acrylic resin (A), second acrylic resin (B) and acid cross-linking agent (C). The first acrylic resin (A) has at least one group, represented by Eq. (1), and at least two epoxy groups in a molecule. The first acrylic resin is in an amount ranging from 1 to 20 parts by weight relative to 100 parts by weight of total of the first acrylic resin (A), the second acrylic resin (B) and the acid cross-linking agent (C).

(1)

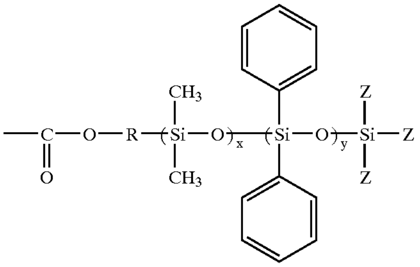

where R is an organic group having a carbon number ranging from 1 to 6; X is a number ranging from 0 to 2; Y is a number ranging from 0 to 2; and Z is $CH_3$ or O—Si—$(CH_3)_3$. The second acrylic resin (B) has at least two epoxy groups in a molecule. The second acrylic resin is in an amount ranging from 20 to 60 parts by weight relative to 100 parts by weight of the total of the first acrylic resin (A), the second acrylic resin (B) and the acid cross-linking agent (C). The acid cross-linking agent (C) has at least two chemically blocked carboxyl groups in a molecule. The acid cross-linking agent is in an amount ranging from 20 to 60 parts by weight relative to the total of the first acrylic resin (A), the second acrylic resin (B) and the acid cross-linking agent (C). The clear paint forms a coat film having a glass transition temperature ranging from 90 to 120° C. upon being hardened. The base coat paint includes third acrylic resin (D), fourth acrylic resin (E) and melamine resin (F). The third acrylic resin (D) has at least two hydroxyl groups in a molecule. The third acrylic resin is in an amount ranging from 15 to 55 parts by weight relative to 100 parts by weight of total of the third acrylic resin (D), the fourth acrylic resin (E) and the melamine resin (F). The fourth acrylic resin (E) has at least two hydroxyl groups and at least two epoxy groups in a molecule. The fourth acrylic resin (E) is in an amount ranging from 15 to 55 parts by weight relative to 100 parts by weight of the total of the third acrylic resin (D), the fourth acrylic resin (E) and the melamine resin (F). The melamine resin (F) has a functional group capable of reacting with a hydroxyl group. The melamine resin is in an amount ranging from 30 to 40 parts by weight relative to 100 parts by weight of the total of the third acrylic resin (D)), the fourth acrylic resin (E) and the melamine resin (F).

DETAILED DESCRIPTION OF THE INVENTION

According to the present invention, a top coat for an outer panel of an automotive vehicle comprises a clear paint and a base coat paint. The clear paint includes first acrylic resin (A), second acrylic resin (B) and acid cross-linking agent (C). The first acrylic resin (A) has at least one ester group containing a silicone group, represented by Eq. (1), and at least two epoxy groups in a molecule. The first acrylic resin is in an amount ranging from 1 to 20 parts by weight relative to 100 parts by weight of total of the first acrylic resin (A), the second acrylic resin (B) and the acid cross-linking agent (C), (1)

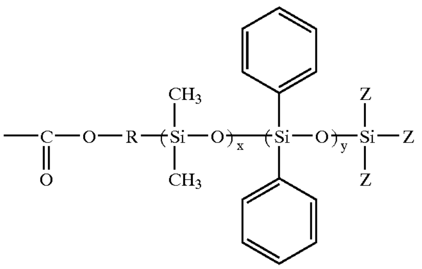

where R is an organic group having a carbon number ranging from 1 to 6; X is a number ranging from 0 to 2; Y is a number ranging from 0 to 2; and Z is $CH_3$ or O—Si—$(CH_3)_3$. The second acrylic resin (B) has at least two epoxy groups in a molecule. The second acrylic resin is in an amount ranging from 20 to 60 parts by weight relative to 100 parts by weight of the total of the first acrylic resin (A), the second acrylic resin (B) and the acid cross-linking agent (C). The acid cross-linking agent (C) has at least two chemically blocked carboxyl groups in a molecule. The acid cross-linking agent is in an amount ranging from 20 to 60 parts by weight relative to the total of the first acrylic resin (A), the second acrylic resin (B) and the acid cross-linking agent (C). The clear paint forms a coat film having a glass transition temperature ranging from 90 to 120° C. upon being hardened.

The base coat paint includes third acrylic resin (D), fourth acrylic resin (E) and melamine resin (F). The third acrylic resin (D) has at least two hydroxyl groups in a molecule. The third acrylic resin is in an amount ranging from 15 to 55 parts by weight relative to 100 parts by weight of total of the third acrylic resin (D), the fourth acrylic resin (E) and the melamine resin (F). The fourth acrylic resin (E) has at least two hydroxyl groups and at least two epoxy groups in a molecule. The fourth acrylic resin (E) is in an amount ranging from 15 to 55 parts by weight relative to 100 parts by weight of the total of the third acrylic resin (D), the fourth acrylic resin (E) and the melamine resin (F). The melamine resin (F) has a functional group capable of reacting with a hydroxyl group. The melamine resin is in an amount ranging from 30 to 40 parts by weight relative to 100 parts by weight of the total of the third acrylic resin (D), the fourth acrylic resin (E) and the melamine resin (F).

In the clear paint of the top coat according to the present invention, the acrylic resin (A) having at least one ester group and at least two epoxy groups in the molecule is produced, for example, by radical copolymerization of alkyl ester containing epoxy group, of (meth)acrylate such as glycidyl (meth)acrylate, methyl glycidyl (meth)acrylate and (meth)acrylate ester having ester group containing silicone group, represented by Eq. (1). The acrylic resin (A) may be produced by radial copolymerization of vinyl polymerizable monomer such as styrene or vinyl toluene, or $C_1$ to $C_{22}$ alkyl ester containing epoxy group, of (meth)acrylate such as methyl (meth)acrylate, ethyl (meth)acrylate, propyl (meth) acrylate, butyl (meth)acrylate, hexyl (meth)acrylate, octyl (meth)acrylate, lauryl (meth)acrylate, cyclohexyl (meth) acrylate and 2-ethylhexyl (meth)acrylate, alkyl ester containing epoxy group, of (meth)acrylate such as glycidyl (meth)acrylate and methyl glycidyl (meth)acrylate, and the (meth)acrylate ester having the ester group containing the silicone group, represented by Eq. (1).

In ester group containing silicone group, represented by Eq. (1), x is the number ranging from 0 to 2. If x is not less that 3, the coat film formed of the clear paint exhibits a high water repellency but is largely lowered in recoatability. Additionally, y is the number ranging from 0 to 2. If y is not less than 3, the compatibility of acrylic resin (A) with other resins constituting the clear paint is improved thereby lowering the water repellency and oil repellency of the coat film. The ester group containing silicone group, represented by Eq. (1) in the acrylic resin (A) has a molecular weight ranging from 300 to 1,000. If the molecular weight of ester group containing silicone group, represented by Eq. (1) in the acrylic resin (A) exceeds 1,000, the compatibility of the acrylic resin (A) and the recoatability of the coat film formed of the clear paint are remarkably lowered. If the molecular weight of the ester group containing the silicone group is less than 300, the water repellency and oil repellency of the coat film are lowered.

In the acrylic resin (A), it is preferable that the content of the epoxy group is such that an epoxy equivalent is in a range of from 200 to 1,000. the epoxy equivalent is less than 200, cross-linking is excessively formed in the acrylic resin (A) thereby resulting in crack of the coat film with lapse of time. If the epoxy equivalent exceeds 1,000, the cross-linking is insufficient and therefore no sufficient coat film performance can be obtained.

The blending amount or content of the acrylic resin (A) is within a range of 1 to 20 parts by weight relative to 100 parts by weight of the total of the acrylic resin (A), the acrylic resin (B) and the acid cross-linking agent (C). If the blending amount of the acrylic resin (A) is less than 1 part by weight, the water repellency of the coat film cannot be obtained. If the blending amount of the acrylic resin (A) exceeds 20 parts by weight, the coat film performance such as recoatability is lowered.

It is preferable that the acrylic resin (A) has a number average molecular weight ranging from 1,000 to 10,000. If the molecular weight is less that 1,000, no sufficient coat film performance can be obtained. If the molecular weight exceeds 10,000, the stability of the clear paint is remarkably lowered thereby increasing the viscosity of the clear paint.

The acrylic resin (B) having at least two epoxy groups in the molecule is produced, for example, by homopolymerization of alkyl ester containing epoxy group, of (meth) acrylate such as glycidyl (meth)acrylate, methyl glycidyl (meth)acrylate, or by copolymerization of the above alkyl ester containing epoxy group, of (meth)acrylate and at least one of a vinyl-polymerizable monomer such as styrene or vinyl toluene, or $C_1$ to $C_{22}$ alkyl ester, of (meth)acrylate such as methyl (meth)acrylate, ethyl (meth)acrylate, propyl (meth)acrylate, butyl (meth)acrylate, hexyl (meth)acrylate, octyl (meth)acrylate, lauryl (meth)acrylate, cyclohexyl (meth)acrylate and 2-ethylhexyl (meth)acrylate.

In the acrylic resin (B), it is preferable that the content of epoxy group is such that an epoxy equivalent is in a range of from 200 to 1,000. If the epoxy equivalent is less than 200, cross-linking is excessively formed thereby lowering a chipping resistance of the coat film. If the epoxy equivalent exceeds 1,000, the cross-linking is insufficient and therefore no sufficient coat film performance can be obtained.

It is preferable that the acrylic resin (B) has a number average molecular weight ranging from 1,000 to 10,000. If the molecular weight is less that 1,000, no sufficient coat film performance can be obtained. If the molecular weight exceeds 10,000, the stability of the clear paint is remarkably lowered thereby increasing the viscosity of the clear paint.

The blending amount or content of the acrylic resin (B) is within a range of 20 to 60 parts by weight relative to 100 parts by weight of the total of the acrylic resin (A), the acrylic resin (B) and the acid cross-linking agent (C). If the blending amount of the acrylic resin (A) is less than 20 parts by weight, no sufficient cross-linking can be formed in the coat film of the clear paint thereby lowering the chipping resistance of the coat film. If the blending amount of the acrylic resin (B) exceeds 60 parts by weight, the concentration of the epoxy group in the clear paint so increases as to remarkably lower a storage stability of the clear paint, while increasing the hydrophilicity of the coat film thereby lowering a moisture resistance of the coat film.

The acid cross-linking agent (C) having at least two chemically blocked carboxyl groups is produced, for example, by blocking carboxyl group of half-ester with vinyl ether compound such as ethyl vinyl ether, 1-proply vinyl ether, 2-propyl vinyl ether, butyl vinyl ether and isobutyl vinyl ether. The half-ester has been previously produced by reaction of hydroxyl group of polyol with maleic acid (anhydride), succinic acid (anhydride), phthalic acid (anhydride), tetrahydrophthalic acid (anhydride) or hexahydrophthalic acid (anhydride). Examples of the polyol are ethylene glycol, glycerol, 1,2,4-butanetriol, trimethylol ethane, trimethylol propane, pentaerythritol, and dipentaerythritol. Additionally, homopolymer of hydroxyethyl (meth)acrylate or hydroxypropyl (meth)acrylate, or copolymer of hydroxyethyl (meth)acrylate or hydroxypropyl (meth)acrylate and alkyl (meth)acrylates or styrenes may be used as the polyol.

The blending amount or content of the acid cross-linking agent (C) is within a range of 20 to 60 parts by weight relative to 100 parts by weight of the total of the acrylic resin (A), the acrylic resin (B) and the acid cross-linking agent (C). If the blending amount of the acid cross-linking agent (C) is less than 20 part by weight, no sufficient cross-linking can be formed in the coat film of the clear paint thereby lowering the performance of the coat film. If the blending amount of the acid cross-linking agent (C) exceeds 60 parts by weight, cross-linking formation in the coat film becomes insufficient thereby lowering the performance of the coat film.

The coat film of the clear paint has a glass transition temperature ranging from 90 to 120° C. upon being hardened. The glass transition temperature is determined by a method in which a viscoelasticity of the single coat film of the clear paint is measured to obtain a value of tan δ, in which a temperature at which the tan δ takes the maximum level is determined as the glass transition temperature. If the glass transition temperature is lower than 90° C., the coat film of the clear paint is lowered in acid rain resistance. If the glass transition temperature exceeds 120° C., the coat film is lowered in scratch resistance.

In the base coat paint of the top coat according to the present invention, the acrylic resin (D) having at least two hydroxyl groups in the molecule is produced, for example, by homopolymerization of alkyl ester containing $C_1$ to $C_{22}$ hydroxyl group, of (meth)acrylate such as 2-hydroxyethyl (meth)acrylate and 2-hydroxypropyl (meth)acrylate, or by copolymerization of the above alkyl ester and other alkyl (meth)acrylates or vinyl-polymerizable monomers such as styrenes.

The blending amount or content of the acrylic resin (D) is within a range of 15 to 55 parts by weight relative to 100 parts by weight of the total of the acrylic resin (D), the acrylic resin (E) and the melamine resin (F). If the blending amount is less than 15 parts by weight, stability of the base coat paint upon lapse of time is lowered. If the blending amount exceeds 55 parts by weight, adhesion of the base coat paint is lowered.

The acrylic resin (E) having at least two hydroxyl groups and at least two epoxy groups in the molecule is produced, for example, by copolymerization of alkyl ester containing epoxy group, of (meth)acrylate such as glycidyl (meth) acrylate and methyl glycidyl (meth)acrylate, and alkyl ester containing hydroxyl group, of (meth)acrylate such as 2-hydroxyethyl (meth)acrylate and 2-hydroxypropyl (meth) acrylate, or by copolymerization of the above two alkyl esters and (meth)acrylate or vinyl-polymerizable monomers such as styrenes.

In acrylic resin (E), it is preferable that the content of epoxy group is such that an epoxy equivalent is in a range of from 500 to 5,000. If the epoxy equivalent is less than 500, the stability of the base coat paint upon lapse of time is lowered thereby causing an excessive viscosity increase of the base coat paint. If the epoxy equivalent exceeds 5,000, formation of cross-linking between the base coat paint and the clear paint becomes insufficient thereby causing lowering in adhesion and lowering in chipping resistance.

The blending amount or content of the acrylic resin (E) is within a range of 15 to 55 parts by weight relative to 100 parts by weight of the total of the acrylic resin (D), the acrylic resin (E) and the melamine resin (F). If the blending amount is less than 15 parts by weight, adhesion of the base coat paint is lowered. If the blending amount exceeds 55 parts by weight, the stability of the base coat paint upon lapse of time is lowered.

The melamine resin (F) having a functional group capable of reacting with hydroxyl group is for a paint and is typically produced first by reacting formaldehyde with a part of or all amino groups of melamine (2,4,6-triamino-1,3,5-triazine) so as to provide methylol groups, and then by reacting alcohol with a part of the methylol groups to form alkyl ether.

The blending amount or content of the acrylic resin (F) is within a range of 30 to 40 parts by weight relative to 100 parts by weight of the total of the acrylic resin (D), the acrylic resin (E) and the melamine resin (F). If the blending amount is less than 30 parts by weight, adhesion and weatherability of the base coat paint are lowered. If the blending amount exceeds 40 parts by weight, chipping resistance of the base coat paint is lowered.

The base coat paint may contain, in addition to the above resinous components, coloring pigments, for example, inorganic coloring pigments such as titanium dioxide, zinc oxide, yellow iron oxide, red iron oxide and carbon black, and organic coloring pigments such as phthalocyanine blue, phthalocyanine green, vat (Indanthren) blue, insoluble azo, soluble azo, perylene, quinacridone red, thioindigo red, dioxazine violet, anthrapyrimidine yellow, quinophthalone yellow and benzine yellow, and glittering materials such as aluminum powder, nickel powder and pearl mica.

The top coat of the present invention is coated on the outer panel of the automotive vehicle as follows: First, the base coat paint of the present invention is coated on a part or member to be coated (or the outer panel). Subsequently, the clear paint of the present invention is coated on the base coat paint in a so-called wet-on-wet manner. The thus coated base coat paint and the clear paint are heated to be hardened, thereby forming a hardened coat film of the top coat.

According to the coating process of the top coat of the present invention, hardening of the clear paint is accomplished by reaction of blocked acid groups of the acid cross-linking agent (C) in the clear paint and epoxy groups of the acrylic resins (A) and (B) having water repellency and oil repellency in the clear paint, thereby obtaining good water repellency, oil repellency, acid rain resistance and scratch resistance. Additionally, by blending the acrylic resin having both epoxy groups and hydroxyl groups in the base coat paint, the epoxy groups in the base coat paint and the blocked acid groups react with each other to form cross-linking by which the coat film of the top coat excellent in adhesion and chipping resistance can be formed.

EXAMPLES

The present invention will be more readily understood with reference to the following Examples in comparison with Comparative Examples; however, these Examples are intended to illustrate the invention and are not to be construed to limit the scope of the invention.

In Examples and Comparative Examples, the following acrylic resin (A), acrylic resin (B), acid cross-linking agent (C), acrylic resin (D), acrylic resin (E), and melamine resin (F) were used:

The Acrylic Resin (A)

A "Solvesso 100" (hydrocarbon solvent, the trade name of Exxon Chemical Co., Ltd.) solution of copolymer of glycidyl methacrylate, methyl methacrylate, 2-ethylhexyl methacrylate, 2-ethylhexyl acrylate styrene and TM-0701 which are contained respectively in amounts of 47, 16, 4, 7, 19 and 6 mol %. TM-0701 (the trade name of Chisso Corporation) is methacrylate ester having a functional group represented by Eq. (1) where R is $—(CH_2)_3—$, x is 0, y is 0, Z is $—O—Si—(CH_3)_3$, and has a molecular weight of 420. The solution has a solid content of 60% by weight, an epoxy equivalent of 570 and a number average molecular weight of 6200.

The Acrylic (B)

A "Solvesso 100" (hydrocarbon solvent, the trade name of Exxon Chemical Co., Ltd.) solution of copolymer of glycidyl methacrylate, methyl methacrylate, 2-ethylhexyl methacrylate, 2-ethylhexyl acrylate and styrene which are contained respectively in amounts of 50, 17, 4, 7 and 21 mol %. The solution had a solid content of 60% by weight, an epoxy equivalent of 450 and a number average molecular weight of 6200.

The Acid Cross-linking Agent (C)

A xylene solution of a resin which is obtained by chemically blocking carboxyl groups of a reaction product of trimethylol propane and succinic acid (which are 25/75 in mole ratio) with n-butyl vinyl ether in an amount equivalent to that of the carboxyl groups. The xylene solution had a solid content of 60% by weight, a blocked carboxyl (group) equivalent of the resin being 245 and a number average molecular weight of 730.

The Acrylic Resin (D)

A xylene solution of a copolymer (resin) of 2-hydroxyethyl methacrylate, styrene, methyl methacrylate, butyl methacrylate and butyl acrylate which are contained respectively in amounts of 10, 35, 10, 15 and 30 in mol %. The xylene solution had a solid content of 50 wt. % by weight, a hydroxyl (group) equivalent of the resin being 1,190 and a number average molecular weight of 7,000.

The Acrylic Resin (E)

A xylene solution of a copolymer (resin) of glycidyl methacrylate, 2-hydroxyethyl methacrylate, styrene, methyl methacrylate, butyl methacrylate and butyl acrylate which are contained respectively in amounts of 5, 10, 35, 10, 15 and 20 mol %. The xylene solution had a solid content of 50% by weight, an epoxy equivalent of the resin being 2,400, a hydroxyl (group) equivalent of the resin being 1,200 and a number average molecular weight of 7,000.

The Melamine Resin (F)

A melamine resin having n-butyl groups ("U-Van 20SE-60", the trade name of Mitsui Chemicals, Inc.).

Examples 1 to 4 and Comparative Examples 1 to 3

[Preparation Method of Paints]

For each of Examples and Comparative Examples, a container was supplied with components of a clear paint, weighed in amounts (parts by weight) of solid contents shown the upper part of Table 1. The measured components in the container were mixed upon stirring 20 minutes with a homodisper thereby obtaining the clear paint. Subsequently, another container was supplied with components of a base coat paint, weighed in amounts (parts by weight) of solid contents shown at the lower part of Table 1. The measured components in the container were mixed with a homodisper thereby obtaining the base coat paint. The components of the clear paint included an ultraviolet ray absorbent which was available from Ciba Specialty Chemicals Kabushiki Kaisha under the trade name of "Tinuvin 900", a light stabilizer which was available from Ciba Specialty chemicals Kabushiki Kaisha under the trade name of "Tinuvin 440", and a surface modifier which was available from Mitsubishi Monsanto Ltd. under the trade name of "Modaflow". The components of the base coat paint included an aluminum paste which was available from Showa Aluminum Powder Kabushiki Kaisha under the trade name of "SAP 720N", a Rheology modifier which was available from Kyoeisha Chemical Co., Ltd. under the trade name of "Flownon" SH-290", the above-mentioned ultraviolet ray absorbent, and the above-mentioned surface modifier.

[Coating Method]

A dull steel plate subjected to a chemical conversion treatment was coated with a cationic electrodeposition paint ("Aqua No. 4200", the trade name of BASF NOF Coatings Co., Ltd.) in a thickness of 20 μm and baked at 170° C. for 20 minutes. Subsequently, an intermediate coat ("Hi-Epico No. 560", the trade name of BASF NOF Coatings Co., Ltd.) was coated on the electrodeposition paint to form a coat film (in a dried state) of 35 μm and baked at 140° C. for 30 minutes thereby obtaining a specimen steel plate (or article) to be coated. Next, a thinner (a mixture of xylene/butyl acetate in a weight ratio of 8/2) was added to the base coat paint prepared by the above preparation method, so as to adjust the viscosity of the base coat paint to a value of 13 seconds at 20° C. by Ford Cup No. 4. This base coat paint was coated on the above specimen steel plate by using an air spray so as to form a coat film (in a dried state) of 13 $\mu$m. The thus formed coat film was allowed to stand at an ordinary temperature for 3 minutes. Thereafter, the clear paint prepared by the above preparation method was coated on the formed coat film by using an air spray so as to form a coat film of 35 $\mu$m (in a dried state). The specimen steel plate coated with the base coat and clear paints was allowed to stand at ordinary temperature for 10 minutes, and thereafter baked at 150° C. for 30 minutes thereby obtaining a hardened coat film of the top coat. The thus obtained hardened coat film was subjected to coat film performance tests discussed after in order to evaluate the performances of the coat film as the top coat.

[Coat Film Performance Test and Evaluation]

(a) Coat Film Hardness: The hardness of the hardened coat film was measured according to 8.4.1 test machine method of JIS (Japanese Industrial Standard) K 5400. The obtained hardness level “F” was harder than that “B”, in which the level “F” was evaluated “passed” while the level “B” was evaluated “rejected”.

(b) Moisture Resistance: The moisture resistance was measured according to 9.2.2 rotation test method of JIS K 5400. The test for measuring the moisture resistance was continued for 120 hours. After the test, the condition of the hardened coat film was inspected by visual observation.

(c) Water Repellency: The contact angle of water to the hardened coat film was measured by a contact angle meter (CA-Z type) produced by Kyowa Interface Science Co., Ltd. The contact angle of not less than 85° was evaluated as “passed” while the contact angle of less than 85° was evaluated as “rejected”.

(d) Oil Repellency: The contact angle of xylene and oleic acid to the hardened coat film was measured by the contact angle meter (CA-Z type) produced by Kyowa Interface Science Co., Ltd. The xylene contact angle of not less than 8° was evaluated as “passed” while the xylene contact angle of less than 8° was evaluated as “rejected”. The oleic acid contact angle of not less than 20° was evaluated as “passed” while the oleic acid contact angle of less than 20° was evaluated as “rejected”.

(e) Acid Rain Resistance: 2 ml of 40 wt % sulfuric acid was put as a spot on the hardened coat film, and was allowed to stand at 60° C. for 30 minutes. Then, the abnormality of the hardened coat film was inspected by visual observation.

(f) Adhesion: The adhesion of the hardened coat film was measured according to 8.5.2 cross-cut adhesion test of JIS K 5400. The obtained point of not less than 6 was evaluated as “passed” while the obtained point of less than 6 was evaluated as “rejected”.

(g) Recoat Adhesion: Onto the (first) hardened coat film prepared by the above coating method, another (second) hardened coat film was coated by the same coating method as that of the first hardened coat film. Thereafter, the adhesion of the second hardened coat film to the first hardened coat film was measured according to the 8.5.2 cross-cut adhesion test of JIS K 5400. The obtained point of not less than 6 was evaluated as “passed” while the obtained point of less than 6 was evaluated as “rejected”.

(h) Chipping Resistance: Test for measuring the chipping resistance of the hardened coat layer was conducted according to ASTM-D-3170 as follows: A test plate was prepared by covering the surface of the hardened coat film with a tape coated with adhesive, leaving a central section of the surface of the hardened coat film which section had an area of 40×40 mm. The test plate was installed to a test plate holder of a test apparatus “Q-G-R Gravel Chipping Test Instrument” produced by Q-Panel Lab Products. Then, chipping agent (about 250 marble particles having a diameter of 10 to 15 mm were sprayed at an air pressure of about 4.8 kg/$cm^2$ onto the test plate at a test temperature of 20° C. After the test, an average peeled area of the hardened coat film made by collision of the marble particles was measured. The peeled area of not larger than 0.3 $mm^2$ was evaluated as “passed” while the peeled area of larger than 0.3 $mm^2$ was evaluated as “rejected”.

(i) Weatherability: The weatherability of the hardened coat film was measured according to 2.2.1 accelerated weathering test of JIS D 0205 in which a fluorescent light type accelerated weathering tester was used. After lapse of a test time of 2,000 hours, the abnormality (crack) of the hardened coat film was inspected.

(j) Scratch Resistance: A flannel cloth having a dimension of 2×2 mm was coated with 1 ml of 20% aqueous suspension of dust of Kanto loam layer (test dust No. 8 according to JIS Z 8901). The flannel cloth was installed to a reciprocating head section of a wear test apparatus produced by Taiyu Kizai Co., Ltd. The test apparatus was operated in such a manner that the head section made its 20 reciprocating movements in a condition where the flannel cloth was in contact with the hardened coat film at a load of 50 g so that scratch was made at the surface of the hardened coat film. Thereafter, the brightness value L* of the scratched surface of the hardened coat film was measured by a color difference meter (“SM-7 type”) produced by Suga Test Instruments Co., Ltd. Then, a brightness difference value ΔL* was calculated as a difference between the measured brightness value and an initial brightness value which had been previously measured for the surface of the hardened coat film in an initial state before making the scratch. As a result, the brightness difference value ΔL* of not higher than 15 was evaluated as “passed” while the brightness difference value ΔL* higher than 15 was evaluated as “rejected”.

(k) Glass Transition Temperature: The dynamic viscoelasticity of the single coat film of the clear paint was measured by a dynamic viscoelasticity meter “Rheovibron DDV-01FP type” produced by Orientec Co., Ltd. so as to obtain the value of tan δ. The temperature at which the tan δ value becomes the maximum was determined as the glass transition temperature of the clear paint.

(l) Storage stability: A thinner (mixture of xylene/butyl acetate in a weight ratio of 8/2) was added to the clear paint prepared by the above preparation method, so as to adjust the initial viscosity of the clear paint to a value of 24 seconds at 20° C. by Ford Cup No. 4. Then, the thus thinned clear paint was stored at 50° C. for 7 days. After storing, the viscosity of the thinned clear paint was measured at 20° C. by the Ford Cup No. 4. In case that the difference between the initial viscosity and the viscosity after storing was not longer than 2 seconds, evaluation was made as “passed”.

(m) Finished Appearance: The appearance in a finished state of the hardened coat film of the top coat was evaluated by visual observation.

(n) Staining Resistance

The hardened coat film of the top coat was subjected to an outdoor exposure test for 3 months, according to 9.9 weathering test of JIS K 5400 (1990). After the outdoor exposure test, a color value L of the hardened coat film in a state of being not washed was measured according to 7.4.2 measuring method of JIS K 5400 (1990). Then, a value $\Delta L$ was calculated subtracting an initial color value L in a state before the outdoor exposure test from the measured color value L after the outdoor exposure test. Evaluation was made by the following standards:

A (excellent): the $\Delta L$ value was smaller than 3;

B (good): the $\Delta L$ value was from not smaller than 3 to smaller than 4;

C ((bad): the $\Delta L$ value was from not smaller than 4 to smaller than 6; and D (worse): the $\Delta L$ value was not smaller than 6.

As appreciated from the above, the top coat according to the present invention comprises the clear paint and the base coat paint. The clear paint is constituted of the acrylic resin (A) having the specified ester group containing silicone group, the acryl resin (B) having epoxy groups, and the acid cross-linking agent (C) having chemically blocked carboxyl groups, in specific blending amounts. The base coat paint is constituted of the acrylic resin (D) having hydroxyl groups, the acrylic resin (E) having hydroxyl groups and epoxy groups, and the melamine resin (F) having functional group capable of reacting with hydroxyl group, in specific amounts. Accordingly, the top coat according to the present invention is excellent in staining resistance, water repellency, oil repellency, acid rain resistance, scratch resistance, chipping resistance, weatherability and finished appearance.

The entire contents of Japanese Patent Application P2002-069768 (filed Mar. 14, 2002) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

TABLE 1

| | Example 1 | Example 2 | Example 3 | Example 4 | Comparative example 1 | Comparative example 2 | Comparative example 3 |
|---|---|---|---|---|---|---|---|
| Clear paint | | | | | | | |
| Acrylic resin (A) | 5 | 15 | 5 | 15 | 0 | 25 | 15 |
| Acrylic resin (B) | 50 | 40 | 45 | 35 | 70 | 30 | 40 |
| Acid cross-linking agent (C) | 45 | 45 | 50 | 50 | 30 | 45 | 45 |
| Ultraviolet ray absorbent | 0.6 | 0.6 | 0.6 | 0.6 | 0.6 | 0.6 | 0.6 |
| Light stabilizer | 0.3 | 0.3 | 0.3 | 0.3 | 0.3 | 0.3 | 0.3 |
| Surface modifier | 0.1 | 0.1 | 0.1 | 0.1 | 0.1 | 0.1 | 0.1 |
| Xylene | 10 | 10 | 10 | 10 | 10 | 10 | 10 |
| Butyl acetate | 2.0 | 2.0 | 2.0 | 2.0 | 2.0 | 2.0 | 2.0 |
| Base coat paint | | | | | | | |
| Acrylic resin (D) | 39 | 26 | 39 | 26 | 39 | 26 | 65 |
| Acrylic resin (E) | 26 | 39 | 26 | 39 | 26 | 39 | 0 |
| Melamine resin (F) | 35 | 35 | 35 | 35 | 35 | 35 | 35 |
| Aluminum paste | 3 | 3 | 3 | 3 | 3 | 3 | 3 |
| Rheology modifier | 1 | 1 | 1 | 1 | 1 | 1 | 1 |
| Ultraviolet ray adsorbent | 0.5 | 0.5 | 0.5 | 0.5 | 0.5 | 0.5 | 0.5 |
| Surface modifier | 0.1 | 0.1 | 0.1 | 0.1 | 0.1 | 0.1 | 0.1 |
| Butyl acetate | 2 | 2 | 2 | 2 | 2 | 2 | 2 |
| Xylene | 5 | 5 | 5 | 5 | 5 | 5 | 5 |
| n-Buthanol | 2 | 2 | 2 | 2 | 2 | 2 | 2 |

TABLE 2

| | Example 1 | Example 2 | Example 3 | Example 4 | Comparative example 1 | Comparative example 2 | Comparative example 3 |
|---|---|---|---|---|---|---|---|
| Coat film hardness | F | F | F | F | B | B | F |
| Moisture resistance | No abnormality | No abnormality | No abnormality | No abnormality | Blushing occurred | Blushing occurred | No Abnormality |
| Water contact angle | Passed | Passed | Passed | Passed | Rejected | Passed | Passed |
| Xylene contact angle | Passed | Passed | Passed | Passed | Rejected | Passed | Passed |
| Oleic acid contact angle | Passed | Passed | Passed | Passed | Rejected | Passed | Passed |
| Acid rain resistance | No abnormality | No abnormality | No abnormality | No abnormality | Corrosion occurred | Corrosion occurred | No Abnormality |
| Adhesion | Passed | Passed | Passed | Passed | Rejected | Rejected | Rejected |
| Recoat adhesion | Passed | Passed | Passed | Passed | Rejected | Rejected | Rejected |
| Chipping resistance | Passed | Passed | Passed | Passed | Rejected | Rejected | Rejected |

TABLE 2-continued

| | Example 1 | Example 2 | Example 3 | Example 4 | Comparative example 1 | Comparative example 2 | Comparative example 3 |
|---|---|---|---|---|---|---|---|
| Weatherability | No abnormality | No abnormality | No abnormality | No abnormality | Blushing occurred | Blushing occurred | Crack occurred |
| Scratch resistance | Passed | Passed | Passed | Passed | Passed | Passed | Passed |
| Glass trans. temp. of clear paint | 112 | 108 | 101 | 96 | 63 | 58 | 108 |
| Storage stability | Passed | Passed | Passed | Passed | Viscosity increased (4 sec.) | Viscosity increased (3 sec.) | Passed |
| Finished appearance | Good | Good | Good | Good | Good | Round feeling appeared | Good |
| Staining resistance | A | A | A | A | D | D | B |

What is claimed is:

1. A top coat for an outer panel of an automotive vehicle, comprising:

a clear paint including first acrylic resin (A), second acrylic resin (B) and acid cross-linking agent (C), the first acrylic resin (A) having at least one group, represented by Equation (1), and at least two epoxy groups in a molecule, the first acrylic resin being in an amount ranging from 1 to 20 parts by weight relative to 100 parts by weight of total of the first acrylic resin (A), the second acrylic resin (B) and the acid cross-linking agent (C), (1)

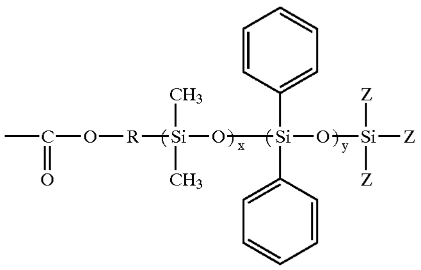

where R is an organic group having a carbon number ranging from 1 to 6; x is a number ranging from 0 to 2; y is a number ranging from 0 to 2; and Z is $CH_3$ or O—Si—$(CH_3)_3$, wherein the group represented by equation (1) in the first acrylic resin (A) has a molecular weight ranging from 300 to 1000, the second acrylic resin (B) having at least two epoxy groups in a molecule, the second acrylic resin being in an amount ranging from 20 to 60 parts by weight relative to 100 parts by weight of the total of the first acrylic resin (A), the second acrylic resin (B) and the acid cross-linking agent (C), the acid cross-linking agent (C) having at least two chemically blocked carboxyl groups in a molecule, the acid cross-linking agent being in an amount ranging from 20 to 60 parts by weight relative to the total of the first acrylic resin (A), the second acrylic resin (B) and the acid cross-linking agent (C), the clear paint forming a coat film having a glass transition temperature ranging from 90 to 120° C. upon being hardened; and a base coat paint including third acrylic resin (D), fourth acrylic resin (E) and melamine resin (F), the third acrylic resin (D) having at least two hydroxyl groups in a molecule, the third acrylic resin being in an amount ranging from 15 to 55 parts by weight relative to 100 parts by weight of total of the third acrylic resin (D), the fourth acrylic resin (E) and the melamine resin (F), the fourth acrylic resin (E) having at least two hydroxyl groups and at least two epoxy groups in a molecule, the fourth acrylic resin (E) being in an amount ranging from 15 to 55 parts by weight relative to 100 parts by weight of the total of the third acrylic resin (D), the fourth acrylic resin (E) and the melamine resin (F), the melamine resin (F) having a functional group capable of reacting with a hydroxyl group, the melamine resin being in an amount ranging from 30 to 40 parts by weight relative to 100 parts by weight of the total of the third acrylic resin (D), the fourth acrylic resin (E) and the melamine resin (F).

2. A process of coating a top coat for an outer panel of an automotive vehicle, comprising:

coating a base coat paint on an article;

coating a clear paint on the coated base coat paint in a wet-on-wet manner; and heating the base coat paint and the clear paint to harden the paints so as to form a hardened coat film of the top coat, wherein the clear paint includes first acrylic resin (A), second acrylic resin (B) and acid cross-linking agent (C), the first acrylic resin (A) having at least one group, represented by Eq. (1), and at least two epoxy groups in a molecule, the first acrylic resin being in an amount ranging from 1 to 20 parts by weight relative to 100 parts by weight of total of the first acrylic resin (A), the second acrylic resin (B) and the acid cross-linking agent (C), (1)

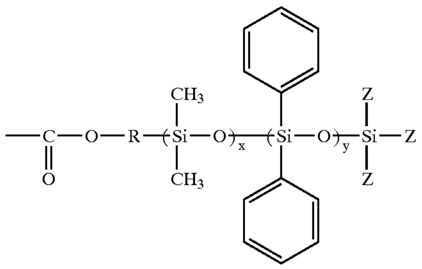

where R is an organic group having a carbon number ranging from 1 to 6; x is a number ranging from 0 to 2; y is a number ranging from 0 to 2; and Z is $CH_3$ or O—Si—$(CH_3)_3$, wherein the group represented by equation (1) in the first acrylic resin (A) has a molecular weight ranging from 300 to 1000, the second acrylic resin (B) having at least two epoxy groups in a molecule, the second acrylic resin being in an amount ranging from 20 to 60 parts by weight relative to 100 parts by weight of the total of the first acrylic resin (A), the second acrylic resin (B) and the acid cross-linking agent (C), the acid cross-linking agent (C) having at least two chemically blocked carboxyl groups in a molecule, the acid cross-linking agent being in an amount ranging from 20 to 60 parts by weight relative to the total of the first acrylic resin (A), the second acrylic resin (B) and the acid cross-linking agent (C), the clear paint forming a coat film having a glass transition temperature ranging from 90 to 120° C. upon being hardened, and the base coat paint includes third acrylic resin (D), fourth acrylic resin (E) and melamine resin (F), the third acrylic resin (D) having at least two hydroxyl groups in a molecule, the third acrylic resin being in an amount ranging from 15 to 55 parts by weight relative to 100 parts by weight of total of the third acrylic resin (D), the fourth acrylic resin (E) and the melamine resin (F), the fourth acrylic resin (E) having at least two hydroxyl groups and at least two epoxy groups in a molecule, the fourth acrylic resin (E) being in an amount ranging from 15 to 55 parts by weight relative to 100 parts by weight of the total of the third acrylic resin (D), the fourth acrylic resin (E) and the melamine resin (F), the melamine resin (F) having a functional group capable of reacting with a hydroxyl group, the melamine resin being in an amount ranging from 30 to 40 parts by weight relative to 100 parts by weight of the total of the third acrylic resin (D), the fourth acrylic resin (E) and the melamine resin (F).

3. A coat film of a top coat for an outer panel of an automotive vehicle, comprising:

a layer of a base coat paint formed on an article; and a layer of a clear paint formed on the layer of the base coat paint, the coat film being formed by a process including coating the base coat paint on the article; coating the clear paint on the coated base coat paint in a wet-on-wet manner; and heating the base coat paint and the clear paint to harden the paints so as to form the coat film in a hardened state, wherein the clear paint includes first acrylic resin (A), second acrylic resin (B) and acid cross-linking agent (C), the first acrylic resin (A) having at least one group, represented by Eq. (1), and at least two epoxy groups in a molecule, the first acrylic resin being in an amount ranging from 1 to 20 parts by weight relative to 100 parts by weight of total of the first acrylic resin (A), the second acrylic resin (B) and the acid cross-linking agent (C), (1)

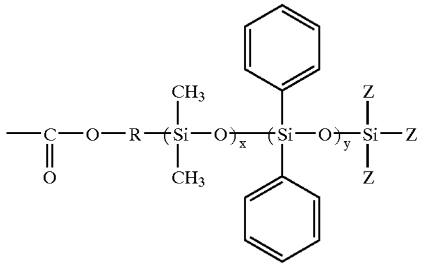

where R is an organic group having a carbon number ranging from 1 to 6; x is a number ranging from 0 to 2; y is a number ranging from 0 to 2; and Z is $CH_3$ or O—Si—$(CH_3)_3$, wherein the group represented by equation (1) in the first acrylic resin (A) has a molecular weight ranging from 300 to 1000, the second acrylic resin (B) having at least two epoxy groups in a molecule, the second acrylic resin being in an amount ranging from 20 to 60 parts by weight relative to 100 parts by weight of the total of the first acrylic resin (A), the second acrylic resin (B) and the acid cross-linking agent (C), the acid cross-linking agent (C) having at least two chemically blocked carboxyl groups in a molecule, the acid cross-linking agent being in an amount ranging from 20 to 60 parts by weight relative to the total of the first acrylic resin (A), the second acrylic resin (B) and the acid cross-linking agent (C), the clear paint forming a coat film having a glass transition temperature ranging from 90 to 120° C. upon being hardened, and the base coat paint includes third acrylic resin (D), fourth acrylic resin (E) and melamine resin (F), the third acrylic resin (D) having at least two hydroxyl groups in a molecule, the third acrylic resin being in an amount ranging from 15 to 55 parts by weight relative to 100 parts by weight of total of the third acrylic resin (D), the fourth acrylic resin (E) and the melamine resin (F), the fourth acrylic resin (E) having at least two hydroxyl groups and at least two epoxy groups in a molecule, the fourth acrylic resin (E) being in an amount ranging from 15 to 55 parts by weight relative to 100 parts by weight of the total of the third acrylic resin (D), the fourth acrylic resin (E) and the melamine resin (F), the melamine resin (F) having a functional group capable of reacting with a hydroxyl group, the melamine resin being in an amount ranging from 30 to 40 parts by weight relative to 100 parts by weight of the total of the third acrylic resin (D), the fourth acrylic resin (E) and the melamine resin (F).

* * * * *